(12) United States Patent
Huang et al.

(10) Patent No.: US 8,544,565 B2
(45) Date of Patent: *Oct. 1, 2013

(54) LOST CIRCULATION CONTROL FLUIDS FOR NATURALLY FRACTURED CARBONATE FORMATIONS

(75) Inventors: Tianping Huang, Spring, TX (US); James B. Crews, Willis, TX (US); David E. Clark, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 416 days.

This patent is subject to a terminal disclaimer.

(21) Appl. No.: 12/907,529

(22) Filed: Oct. 19, 2010

(65) Prior Publication Data
US 2011/0083902 A1   Apr. 14, 2011

Related U.S. Application Data

(63) Continuation-in-part of application No. 12/606,502, filed on Oct. 27, 2009, now Pat. No. 7,942,215, which is a continuation-in-part of application No. 11/626,163, filed on Jan. 23, 2007, now Pat. No. 7,992,640.

(51) Int. Cl.
*E21B 21/00* (2006.01)
*E21B 33/138* (2006.01)
*C09K 8/06* (2006.01)

(52) U.S. Cl.
USPC ............ 175/64; 166/281; 166/282; 166/300; 175/65; 175/72; 507/103; 507/141; 507/145

(58) Field of Classification Search
USPC .......................................................... 175/64
See application file for complete search history.

(56) References Cited

U.S. PATENT DOCUMENTS

| | | | | |
|---|---|---|---|---|
| 2,146,732 | A * | 2/1939 | Grebe et al. ............ | 175/64 |
| 4,512,552 | A | 4/1985 | Katayama et al. | |
| 5,964,295 | A | 10/1999 | Brown et al. | |
| 5,979,555 | A | 11/1999 | Gadberry et al. | |
| 6,239,183 | B1 | 5/2001 | Farmer et al. | |
| 6,399,546 | B1 * | 6/2002 | Chang et al. ............ | 507/240 |
| 6,667,280 | B2 * | 12/2003 | Chang et al. ............ | 507/240 |
| 6,772,847 | B2 | 8/2004 | Rae et al. | |
| 6,805,198 | B2 | 10/2004 | Huang et al. | |
| 6,857,485 | B2 * | 2/2005 | Patel et al. ............ | 175/64 |
| 6,881,709 | B2 | 4/2005 | Nelson et al. | |
| 7,060,661 | B2 | 6/2006 | Dobson, Sr. et al. | |
| 7,115,546 | B2 | 10/2006 | Qu et al. | |
| 7,119,050 | B2 | 10/2006 | Chang et al. | |
| 7,527,103 | B2 | 5/2009 | Huang et al. | |
| 7,544,643 | B2 | 6/2009 | Huang | |
| 7,942,215 | B2 * | 5/2011 | Huang et al. ............ | 175/64 |
| 7,992,640 | B2 * | 8/2011 | Huang et al. ............ | 166/281 |
| 2002/0132741 | A1 * | 9/2002 | Chang et al. ............ | 507/240 |
| 2002/0147114 | A1 | 10/2002 | Dobson, Sr. et al. | |
| 2003/0119680 | A1 | 6/2003 | Chang et al. | |
| 2004/0152604 | A1 | 8/2004 | Qu et al. | |
| 2006/0084579 | A1 * | 4/2006 | Berger et al. ............ | 507/129 |
| 2006/0211776 | A1 | 9/2006 | Crews | |
| 2007/0056737 | A1 | 3/2007 | Crews et al. | |
| 2008/0103066 | A1 | 5/2008 | Huang | |
| 2008/0139419 | A1 * | 6/2008 | Huang ............ | 507/276 |
| 2010/0252266 | A1 | 10/2010 | Huang et al. | |

OTHER PUBLICATIONS

B.R. Stewart, et al., "Use of a Solids-free Viscous Carrying Fluid in Fracturing Applications: An Economic and Productivity Comparison in Shallow Completions," SPE 30114, European Formation Damage Control Conference, May 15-16, 1995, pp. 379-392, The Hague, Netherlands.
J.E. Brown, et al., "Use of a Viscoelastic Carrier Fluid in Frac-Pack Applications," SPE 31114, SPE Formation Damage Symposium, Feb. 14-15, 1996, pp. 439-448, Lafayette, LA.
ExxonMobile Chemical, "Hydrocarbon Fluids: EXXSOL D 80 Fluid," 2000.
M. Samuel, et al., "Viscoelastic Surfactant Fracturing Fluids: Applications in Low Permeability Reservoirs," SPE 60322, 2000 SPE Rocky Mountain Regional/Low Permeability Reservoirs Symposium, Mar. 12-15, 2000, pp. 1-7, Denver, Colorado.
P.M. McElfresh, et al., "A Single Additive Non-ionic System for Frac Packing Offers Operators a Small Equipment Footprint and High Compatibility with Brines and Crude Oils," SPE 82245, SPE European Formation Damage Conference, May 13-14, 2003, pp. 1-11, The Hague, Netherlands.
Crompton, "HYDROBRITE 200 PO White Mineral Oil," Product Brochure, Sep. 8, 2005, available at http://www.cromptoncorp./servlet.
Crompton, Product Search Results for "White Mineral Oil," Sep. 8, 2005, available at http://www.cromptoncorp.lservlet.
Crompton, Related Product Search Results citing "HYDROBRITE 200 PO White Mineral Oil" and "HYDROBRITE 550 PO White Mineral Oil," Sep. 8, 2005, available at http://www.cromptoncorp.lservlet.
H.A. Nasr-El-Din et al.; "Acid Fracturing of Deep Gas Wells Using a Surfactant-Based Acid: Long-Term Effects on Gas Production Rate," SPE 102469, 2006 SPE Annual Technical Conference and Exhibition, Sep. 24-27, 2006, San Antonio, Texas.
H.A. Nasr-El-Din et al.; "Lessons Learned and Guildelines for Matrix Acidizing With Viscoelastic Surfactant Diversion in Carbonate Formations," SPE 102468, 2006 SPE Annual Technical Conference and Exhibition, Sep. 24-27, 2006, San Antonio, Texas.

* cited by examiner

Primary Examiner — George Suchfield
(74) Attorney, Agent, or Firm — Mossman Kumar & Tyler PC

(57) ABSTRACT

Compositions including relatively low reactivity acids and having a pH of from about 2 to about 5, mixed with viscoelastic surfactants (VESs) and internal breakers may serve as fluids, in a non-limiting embodiment as drilling fluids, to open underground hydrocarbon reservoirs with carbonate contents of 10 wt % or above. The fluids initially have low viscosities. After the fluid flows out of the drill bit, the acids react with carbonates in the formation thereby increasing the pH of the fluids causing the VES to gel the fluid at the bottom of the hole and within the formation rock. Even when the subterranean formation contains naturally-occurring fractures, the viscosified fluid will reduce fluid loss into the formation. After drilling through the targeted formation, internal breakers in the viscosified fluids will break down the fluids to permit their removal, and production of the well with very little or no near well bore damage.

20 Claims, 3 Drawing Sheets

LOST CIRCULATION CONTROL FLUIDS FOR NATURALLY FRACTURED CARBONATE FORMATIONS

CROSS REFERENCE TO RELATED APPLICATIONS

This application is a continuation-in-part from U.S. patent application Ser. No. 12/606,502 filed Oct. 27, 2009, issued May 17, 2011 as U.S. Pat. No. 7,942,215 which in turn is a continuation-in-part patent application from U.S. patent application Ser. No. 11/626,163 filed Jan. 23, 2007, issued Aug. 9, 2011 as U.S. Pat. No. 7,992,640.

TECHNICAL FIELD

The present invention relates to methods of drilling through reservoir sections of subterranean formations during hydrocarbon recovery operations, and more particularly relates, in one non-limiting embodiment, to using fluids that contain viscoelastic surfactants and relatively low reactivity acids to drill through subterranean reservoirs having relatively high carbonate contents which react with the acids.

TECHNICAL BACKGROUND

Drilling fluids are special fluids designed exclusively for drilling through the reservoir section of a subterranean formation. The reasons for using a specially designed drilling fluids include, but are not necessarily limited to (1) to drill the reservoir zone successfully, which is often a long, horizontal drain hole, (2) to minimize damage of the near-wellbore region and maximize the production of exposed zones, and (3) to facilitate the necessary well completion. Well completion may include complicated procedures. Typically, drilling fluids may resemble completion fluids. Drilling fluids may be brines containing only selected solids of appropriate particle size ranges (for instance, salt crystals or calcium carbonate) and polymers. Usually, additives needed for filtration control and cuttings carrying are present in a drilling fluid. As noted, drilling fluids may contain filtration control additives to inhibit or prevent loss of the drilling fluid into the permeable formation. Fluid loss involves the undesired leakage of the liquid phase of drilling fluid containing solid particles into the formation matrix. The resulting buildup of solid material or filter cake against the borehole wall may be undesirable, as may be the penetration of the filter cake into the formation. The removal of filter cake, which sometimes must be done by force, may often result in irreparable physical damage to the near-wellbore region of the reservoir. Fluid-loss additives are used to control the process and avoid potential damage of the reservoir, particularly in the near-wellbore region. Specially designed fluids may be used to be placed next to the reservoir and make a seal. This fluid may be different than the drilling fluid and is often referred to as a "sealing or lost circulation pill", Subterranean formations having naturally occurring fractures present a problem because the fractures exacerbate undesired leakage of the liquid portion of the drilling fluid into the formation. Thus, lost circulation fluid may be a major challenge when drilling through such naturally fractured carbonate formations.

Acidizing wells is a conventional process for increasing or restoring the permeability of subterranean formations so as to facilitate the flow of oil and gas from the formation into the well. This process involves treating the formation with an acid to dissolve fines and carbonate scale that are plugging or clogging the pores, thereby opening the pores and other flow channels and increasing the permeability of the formation. Continued pumping forces the acid into the formation, where it etches channels or wormholes. These channels provide ways for the formation hydrocarbons to enter the well bore. However, if the acid is too strong it will undesirably corrode casing, tubing and downhole equipment such as gravel pack screens and downhole pumps, and will also undesirably increase the widths of the naturally occurring fractures making the potential for fluid loss even greater.

It would thus be desirable to discover drilling fluid or a sealing pill, a drilling fluid or other fluid which would have relatively low viscosity in the drilling pipe but which would shortly after leaving the drill bit increase in viscosity and inhibit or prevent fluid leak-off into the formation, while minimizing formation damage, even in the presence of naturally-occurring fractures.

SUMMARY

There is provided in one non-restrictive version, a method of drilling into a subterranean formation that involves introducing a drilling or sealing pill fluid or other fluid into a wellbore, which wellbore passes at least partially through the subterranean formation. The fluid contains water and/or brine, at least one viscoelastic surfactant (VES) and at least one acid that may be an organic acid, a mineral acid and combinations thereof. The VES is present in the fluid in an amount effective to increase the viscosity of the fluid but for the presence of the at least one acid. The fluid has a pH between about 2 to about 5. The method further involves at least partially consuming the at least one acid from the fluid by reaction of the at least one acid with a mineral in the subterranean formation. This acid consumption increases the pH of the fluid to an extent sufficient to increase the viscosity of the fluid by the action of the VES in the drilling fluid to inhibit fluid loss into the formation. The mineral in the formation may include, but not necessarily be limited to, a carbonate, an evaporite, a salt dome, and/or shale. The formation also includes at least one naturally-occurring fracture.

There is also provided, in another non-limiting form, a method of drilling into a subterranean formation that involves introducing into a wellbore and the subterranean formation a drilling or sealing pill fluid. The fluid includes water and/or brine, at least one viscoelastic surfactant (VES) and from about 0.5 to about 30 wt %, based on the total fluid, of at least one acid. The acid may be one or more organic acids and/or one or more mineral acids. The VES is present in an amount effective to increase the viscosity of the fluid but for the presence of the acid. More specifically, suitable acids include, but are not necessarily limited to, succinic acid, glutaric acid, adipic acid, acetic acid, malic acid, lactic acid, polylactic acid, glycolic acid, polyglycolic acid, methanesulfonic acid, formic acid, citric acid, tartaric acid, and/or hydrochloric acid. The fluid has a pH between about 2 to about 5. The method further involves at least partially consuming the at least one acid from the fluid by reaction of the acid with a mineral in the subterranean formation. This acid consumption increases the pH of the fluid sufficiently to increase the viscosity of the fluid by the action of the VES in the fluid to inhibit fluid loss into the formation. Again, the mineral in the formation may be one of those mentioned above.

There may be further provided, in another non-limiting embodiment, a method of drilling into a subterranean formation that involves introducing into a wellbore and the subterranean formation through which the wellbore passes, a drilling or sealing pill fluid. The fluid contains water and/or brine, at least one viscoelastic surfactant (VES), at least one internal breaker and at least one acid. The acid may be an organic acid, a mineral acid and combinations thereof. The VES is present in an amount that would increase the viscosity of the fluid but for the presence of the acid. The fluid has a pH between about 2 to about 5. The method further involves at least partially consuming the acid from the fluid by reaction of the acid with a mineral in the subterranean formation. This consumption increases the pH of the fluid sufficiently to increase the viscosity of the fluid by the action of the VES in at least part of the fluid thereby inhibiting fluid loss into the formation. The method additionally involves subsequently activating the internal breaker thereby reducing the viscosity of the fluid adjacent the wellbore. The mineral in the formation may be any of those already described.

DETAILED DESCRIPTION

An aqueous system comprising a relatively low reactivity acid, a viscoelastic surfactant and an internal breaker has been discovered to be a useful drilling or sealing pill fluid to penetrate subterranean formations via a well bore, where the formations are naturally fractured, but still controlling fluid loss. These fluids may open underground oil and/or gas reservoirs having carbonate contents of 10 wt % or more. The fluids have low viscosities within the drilling pipe since the amount of acid is sufficient to keep the VES from gelling or increasing the viscosity of the water and/or brine. During drilling, the fluid, which has a pH of from about 2 to about 5, flows out at the drill bit and the acid reacts with the carbonate and other minerals in the formation. Generally, this higher pH means that a lower amount of carbonate is dissolved by the acid. This increases the pH of the fluid. The increase in pH and the concentration of divalent ions ($Ca^{++}$, $Mg^{++}$ after reaction of minerals with the acid) will case the VES to form elongated micelles and will gel the fluid at the bottom of the hole and the downhole annulus between the drilling pipe and the formation rock, that is, adjacent the wellbore, as well as fluid within the formation rock. This gelled fluid inhibits the fluid loss of the fluid into the formation. The viscosified fluid also will carry non-dissolved and/or non-dissolvable drilling debris, e.g. cuttings to the surface while it is gelled.

The gelled fluid is not too viscous as to inhibit the motion or rotation of the drill string. Further, since low reactivity acids may be employed, potential corrosion of the drill string, drill bit and other equipment is minimized. Additionally, the small amount of dissolved carbonates on the walls of the fractures caused by the fluid system is not expected to noticeably increase the width of the fractures. After the viscous VES fluid is circulated to surface, fresh acid will need to be added to the drilling VES fluid for continue drilling.

In the non-limiting embodiment where the fluid is a drilling fluid, after drilling through the targeted reservoir or formation, the internal breakers in the viscosified drilling fluid will subsequently break down the entangled and elongated micelles and the drilling fluid may be produced back. The well is then ready to be produced having no or very little near-wellbore damage. Compared with a drilling fluid containing no acid, this drilling fluid system will increase drilling speed by an additional chemical means as the acid reacts with the contacted formation rock. Optionally, high viscosity mineral oil may be added to the drilling fluid system to further improve fluid loss control.

Figure 1:
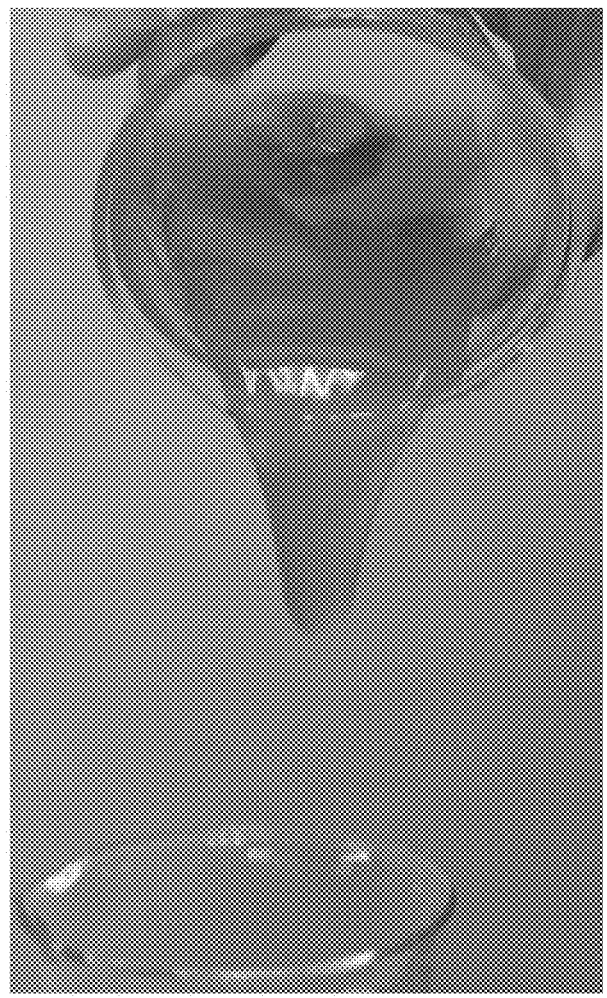
FIG. 1 is a photograph that shows how an aqueous fluid containing spent acid containing a VES gelling agent exhibits very high viscosity at static and very low fluid shear rate conditions.

As noted, a viscous gel starts to develop when the acid contacts and reacts with the carbonate in the subterranean formation. As the acid is spent, the pH of the fluid at that location increases and in turn the viscosity of the acid VES fluid increases. This phenomenon is illustrated in FIG. 1. The viscoelastic surfactant gelled acid fluid (which may contain fish oil or other internal breaker) maintains a higher viscosity to inhibit or prevent the fluid from leaking off deeper into the formation. After completion of drilling through the target formation, the monoenoic or polyenoic acid (e.g. fish oil) or other substance acts as an internal breaker to break the viscous gel, i.e. to lower the viscosity of the fluid. The internally broken acid-spent VES fluid is then very easy to flow back with the producing fluid, leaving little or no damage to the formation. Very little reservoir pressure or time is required to produce and clean up the broken acid-spent VES fluid.

The fluid contains relatively low reactivity acids. It has been found that particularly useful low reactivity acids are organic acids that contain at least one water-soluble dicarboxylic acid. In one non-limiting embodiment herein, the dicarboxylic acid is of relatively low molecular weight, that is, has a formula weight of 175 or less. Suitable dicarboxylic acids therefore include, but are not necessarily limited to, oxalic acid (ethanedioic acid), malonic acid (propanedioic acid), succinic acid (butanedioic acid), glutaric acid (pentanedioic acid), adipic acid (hexanedioic acid), pimelic acid (heptanedioic acid), and mixtures thereof. In another non-restrictive version, the dicarboxylic acids are selected from the group consisting of succinic acid, glutaric acid, adipic acid, and mixtures thereof. Interestingly, glutaric acid, succinic acid, and adipic acid have been used as components for corrosion inhibitors for ferrous metals, according to U.S. Pat. No. 4,512,552. Mixtures of succinic acid, glutaric acid, and adipic acid are generally available as a by-product stream. More information may be found in U.S. Pat. No. 6,805,198 to Huang, et al. assigned to Baker Hughes Incorporated, and incorporated herein by reference in its entirety.

Other suitable relatively low reactivity acids include, but are not necessarily limited to, acetic acid, malic acid, lactic acid, polylactic acid, glycolic acid, polyglycolic acid, formic acid, citric acid, tartaric acid, methanesulfonic acid, low concentration hydrochloric acid, and combinations thereof. Low concentration HCl is defined herein as equal to or less than 7.5%, alternatively equal to or less than 5%. High concentration HCl is defined herein as greater than 7.5%, alternatively greater than 10%. The acids may be liquids or solids as long as they react with and are consumed by the minerals in the reservoir being drilled. As noted, the pH of the fluid exiting the drill bit during a drilling operation through these reservoirs may be between about 2 independently to about 5; and alternatively be between about 3 independently to about 4. The concentration of acid in the fluid ranges from about 0.5 to about 30 wt %, alternatively from about 1.0 independently to about 20 wt % as long as the pH of the fluid is between about 2 independently to about 5 or other range as noted above.

The minerals suitable to react with the acids of the fluid include, but are not necessarily limited to, carbonates, evaporites, salt domes, shales, and combinations thereof. Evaporites are a class of sedimentary minerals and sedimentary rocks that form by precipitation via evaporating an aqueous fluid. Common evaporite minerals include calcite, aragonite, dolomite, halite, gypsum carbonate and anhydrite, which can form as seawater evaporates, and the rocks limestone and dolostone. Certain evaporite minerals, particularly halite, may form excellent cap rocks or seals for hydrocarbon traps because they have minimal porosity and they tend to deform plastically (as opposed to brittle fracturing that would facilitate leakage). The minerals reacted with the low reactivity acids herein include stringers, which are shale layers. Shale is a fine-grained, fissile, detrital sedimentary rock formed by consolidation of clay- and silt-sized particles into thin, relatively impermeable layers. Shale is the most abundant sedimentary rock. Shale can include relatively large amounts of organic material compared with other rock types and thus it has the potential to become a rich hydrocarbon source rock, even though a typical shale contains just 1% organic matter. Its typical fine grain size and lack of permeability, a consequence of the alignment of its platy or flaky grains, allow shale to form a good cap rock for hydrocarbon traps. Some shales are carbonaceous; that is, they contain varying amounts of carbonate minerals that are reactive to acidic fluids.

Suitable solvents or diluents for the acid compositions herein include, but are not necessarily limited to, water, methanol, isopropyl alcohol, alcohol ethers, aromatic solvents, glycols, and mixtures thereof. In one non-limiting embodiment, the composition has an absence of monocarboxylic acids and/or an absence of tricarboxylic acids. Alternatively, in another embodiment, the acid composition has an absence of quaternary ammonium compounds and/or an absence of sulfur-containing corrosion inhibitor activator (e.g. thioglycolic acid, alkali metal sulfonate, etc.). In one non-limiting embodiment, a goal herein is to avoid the use of strong mineral acids, such as high concentrations of HCl and/or $H_2SO_4$, so these acids should be absent from the acid composition in one preferred, alternate embodiment. Again, high concentration is defined herein as greater than 7.5%, alternatively greater than 10%. The acid compositions herein are intended to replace the mineral acid systems previously used, in one non-limiting aspect.

In one non-limiting embodiment, the fluid herein can optionally contain at least one water soluble salt. Selected types and amounts of water soluble salts may be used to optimize the viscosity and elasticity of the aqueous fluid as the low-reactivity acid spends on evaporite minerals at reservoir temperature. The addition of water soluble salts may further be useful to increase the aqueous fluid weight (i.e. density) for developing hydrostatic pressure to control reservoir fluid pressure during drilling. The water soluble salts may include, but are not necessarily limited to: NaCl, KCl, $NH_4Cl$, $CaCl_2$, $MgCl_2$, NaBr, $CaBr_2$, sodium formate, potassium formate, cesium formate, sodium salicylate, and combinations thereof.

As noted, aqueous fluids gelled with viscoelastic surfactants are typically used in wellbore completions, such as hydraulic fracturing, without the use of an internal breaker system, since conventionally and typically they rely on external downhole conditions for the VES-gelled fluid to break, such as dilution with reservoir brine and more importantly gel breaking through interaction with reservoir hydrocarbons during production of such reservoir fluids to the surface. However, reliance on external downhole conditions has shown instances where unbroken or poorly broken VES fluid remains within the reservoir after a VES fluid treatment and has impaired hydrocarbon production. There are aqueous fluids gelled with viscoelastic surfactants that are known to be "broken" or have their viscosities reduced, although some of the known breaking methods utilize external clean-up fluids as part of the treatment design (such as pre- and post-flush fluids placed within the reservoir before and after well completion treatments, such as conventional gravel packing and also "frac-packing"—hydraulic fracturing followed by gravel packing treatment). There are other known methods, but they are relatively slow—for instance the use of VES-gel breaking bacteria with fluid viscosity break times ranging from half a day up to 7 days.

There has evolved in the art an industry standard need for "quick gel break", but for VES-gelled fluids this has been a substantially challenging problem. There needs to be a method for breaking VES-gelled fluids that can be as easy, as quick, and as economical as breaking conventional crosslinked polymer fluids, preferably using an internal breaker. At the same time, it is not desirable to reduce the viscosity of the fluid, i.e. break the gel immediately or essentially instantaneously. The VES-gelled aqueous fluid should maintain its viscosity for a sufficient period of time to perform its intended purpose, for instance, inhibiting or preventing fluid leakoff into the reservoir during the drilling operation. Of concern is the fact than an unbroken VES fluid has exceptionally high viscosity at very low shear rate and static conditions which makes it difficult for reservoir hydrocarbons to contact all of the VES fluid and to displace it from the pores of a treated reservoir. This is particularly true for gas reservoirs and crude oil reservoirs that have heterogeneous permeability with high relative permeability sections present.

A new method has been discovered to reduce the viscosity of aqueous fluids gelled with viscoelastic surfactants (i.e. surfactants that develop viscosity in aqueous brines, including chloride brines, by formation of rod- or worm-shaped micelle structures). The method removes the need or reliance on reservoir hydro-carbons to contact, break, and clean up the viscoelastic fluid. The improvement will allow relatively very quick breaks, such as within 1 to about 16 hours, compared to the current technology of using bacteria to break VES which takes at least 48 or more hours, and more typically 4 to 7 days. In another non-limiting embodiment the break occurs within 1 to about 8 hours; alternatively from 1 to about 4 hours, and in another non-restrictive version 1 to about 2 hours. The breaker component herein may be used as an internal breaker, e.g. added to the gel after batch mixing of a VES-gel treatment, or added on-the-fly after continuous mixing of a VES-gel treatment using a liquid additive metering system in one non-limiting embodiment, or the components can be used separately, if needed, as an external breaker solution to remove VES gelled fluids already placed downhole. The acids, e.g. dicarboxylic acids, in the system herein generally keep the VES from gelling the aqueous fluid until the fluid reaches a carbonate or other mineral-containing formation that reacts with the acids and raises the local pH of that part of the fluid. When this happens, which is after the fluid exits the drill bit, the fluid gels and acts as a temporary barrier within the annulus adjacent the wellbore wall to inhibit or prevent the fluid from leaking into the reservoir, or additionally or alternatively the fluid gels in the near wellbore region of the reservoir and acts as a temporary barrier to inhibit or prevent the fluid from further entering the reservoir. Generally, the pH of the fluid being about 2 independently to about 5 or lower than 5, alternatively from about 3 independently to about 4 or lower is sufficient to inhibit gelling. Once the pH increases to about 4.2, or alternatively to about 4.5 and in another embodiment to about 4.8, VES gelling of the fluid will occur.

The internal breakers (e.g. hydrogenated polyalphaolefin oils, saturated fatty acids, polyunsaturated fatty acids, and the like) are not solubilized in the brine, since they are inherently hydrophobic, but rather interact with the VES surfactant elongated or worm-like micelle structures initially as dispersed microscopic oil droplets and thus form an oil-in-water type emulsion where the oil droplets are dispersed in the internal phase as a discontinuous phase of the brine medium/VES fluid which is the outer phase or continuous phase. Additionally, it is possible for the internal breaker (e.g. unsaturated fatty acids) to exist as individual compounds or molecules associating with the hydrophobic tail portion of the VES molecules, and thereby be dispersed within the elongated or rod-like VES micelles. Laboratory tests have shown that small amounts of unsaturated fatty acids, enough to eventually completely the break VES viscosity, will not spontaneously degrade VES viscosity upon individual association and dispersion within the VES micelles, but will become active to degrade VES viscosity upon an activation event, such as auto-oxidation of the fatty acids to by-products that disrupt the elongated, "rod-like" or "worm-like" micelles. In one non-limiting embodiment, the structure of the VES-molecules becomes spherical or "ball-like", which spheres do not associate with or entangle each other to increase the viscosity of the fluid in which they reside as do the elongated "rod-like" or "worm-like" micelles.

In one non-limiting embodiment, the viscosity of the VES-gelled aqueous fluid is not immediately reduced or broken. Reducing the viscosity of the gel or "breaking" of the fluid should not occur essentially instantaneously. By "essentially instantaneously" is meant less than one-half hour. The rate of viscosity break for a given reservoir temperature by the methods described herein is controlled by type and amount of salts within the mix water (i.e. seawater, KCl, NaBr, $CaCl_2$, $CaBr_2$, $NH_4Cl$ and the like), presence of a co-surfactant (i.e. sodium dodecyl sulfate, sodium dodecyl benzene sulfonate, potassium laurate, potassium oleate, sodium lauryl phosphate, and the like), VES type (i.e. amine oxide, quaternary ammonium salt, and the like), VES loading, the amount of breaker used, the presence of components such as aromatic hydrocarbons, and the like.

It is not important to add the internal breaker after the VES is added to the aqueous fluid. That is, order of addition for the internal breaker, e.g., plant oil, fish oil, and the like is not important. Additionally, in the acid-containing fluids herein, substantial gelling is not expected due to the presence of the dicarboxylic or other acid(s). The acids have been found, in unspent form, to not allow the VES gelling agent to yield viscosity, i.e. to prevent viscosity development. By "substantially gelled" herein is meant that at least 30% of the total viscosity increase has been achieved. In most cases, due to low fluid pH, less than 2% of the total VES viscosity will occur. However, it has been found that the presence of an internal breaker, including but not limited to monoenoic and polyenoic acids, will not prevent the VES gelling agent from viscosifying the acid treatment fluid upon acid spending and fluid pH increasing. A novel and unique feature herein is how the internal breakers may be present during generation of VES viscosity but yet still act as VES viscosity breakers over time at reservoir temperature.

In one non-limiting embodiment these gel-breaking products work by rearrangement of the VES micelles from rod-shaped or worm-shaped elongated structures to spherical structures. The breaking components described herein may also include the unsaturated fatty acid or polyenoic and monoenoic components of U.S. Patent Application Publication 2006/0211776, as well as the parent application hereto U.S. Ser. No. 11/626,163 published as U.S. Patent Application Publication 2010/0071957, both of which are incorporated herein by reference in their entirety. In one non-limiting embodiment these unsaturated fatty acids (e.g. oleic, linoleic, linolenic, eicosapentaenoic, etc.) may possibly be used alone, in oils they are commonly found in (flax oil, soybean oil, etc), and can be provided as custom fatty acid blends (such as Fish Oil 18:12TG by Bioriginal Food & Science Corp.), or used together with other suitable internal breakers. In some cases it is preferred that the plant or fish oil be high in polyunsaturated fatty acids, such as the use of flax oil, salmon oil, and the like. The plant and fish oils may be refined, blended and the like to have the desired polyunsaturated fatty acid composition modified for the compositions and methods herein.

In one non-limiting embodiment, the breaking or viscosity reduction is activated, triggered or initiated by heat. These plant, and animal oils will relatively slowly, upon heating, break or reduce the viscosity of the VES gel with the addition of or in the absence of any other viscosity reducing agent. The amount of internal breaker (fish oil, e.g.), needed to break a VES-gelled fluid appears temperature dependent, with less needed as the fluid temperature increases. For unsaturated fatty acid oils the type and amount of unsaturation (i.e. double carbon bonds) appears to be the major influence on the rate at which the fatty acid oil will break the VES-gelled fluid at a given temperature. Once a fluid is completely broken at an elevated temperature and cooled to room temperature a degree of viscosity reheal may occur but in most cases no rehealing is expected. Strangely enough all of the listed oils will allow initial VES to gel but then later act as controllable breakers with little to no fluid reheal upon breaking. The effective amount of plant oil and/or fish oil ranges from about 0.1 to about 15 gptg based on the total fluid, in another non-limiting embodiment from a lower limit of about 0.5. Independently the upper limit of the range may be about 10 gptg based on the total fluid. (It will be appreciated that units of gallon per thousand gallons (gptg) are readily converted to SI units of the same value as, e.g. liters per thousand liters, $m^3/1000\ m^3$, etc.)

Controlled viscosity reduction rates can be achieved at a temperature of from about 70° F. to about 400° F. (about 21 to about 204° C.), and alternatively at a temperature of from about 100° F. independently to an upper end of the range of about 280° F. (about 38 to about 138° C.), and in another non-limiting embodiment independently up to about 300° F. (149° C.), where "independently" as used in conjunction with ranges herein means any combination of the listed lower and upper thresholds. In one non-limiting embodiment, the fluid designer would craft the fluid system in such a way that the VES gel would break at or near the formation temperature after drilling was accomplished.

In one non-limiting embodiment, fluid internal breaker design would be based primarily on formation temperature, i.e. the temperature the fluid will be heated to naturally in the formation once the drilling is over. Fluid design may take into account the expected cool down of the fluid during a drilling.

The use of the disclosed breaker system is ideal for controlling viscosity reduction of VES-based lost circulation control fluids. The breaking system may also be used for breaking gravel pack fluids, fracturing fluids, acidizing or near-wellbore clean-up diverter fluids, and loss circulation pill fluids composed of VES. The breaker system may additionally work for foamed fluid applications (hydraulic fracturing, acidizing, and the like), where $N_2$ or $CO_2$ gas is used for the gas phase. This VES breaking method is a significant improvement in that it gives breaking rates for VES based fluids that the industry is accustomed to with conventional polymer based fracturing fluids, such as borate crosslinked guar. Potentially more importantly, the use of this internal breaker system in combination with external downhole breaking conditions should help assure and improve hydrocarbon production compared to prior methods that uses only external mechanisms to break the VES fluid for effective and complete VES fluid clean-up after a treatment.

In one non-limiting embodiment, the compositions herein will degrade the gel created by a VES in an aqueous fluid, by disaggregation or rearrangement of the VES micellar structure. However, the inventors do necessarily not want to be limited to any particular mechanism.

It is sometimes difficult to specify with accuracy in advance the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular plant, and/or fish oil used; the temperature of the fluid; the downhole pressure of the fluid, the starting pH of the fluid; the type and amount of salts; and the complex interaction of these various factors. Nevertheless, in order to give an approximate feel for the proportions of the various breaking components to be used in the method herein, approximate ranges will be provided. In an alternative, non-limiting embodiment the amount of fish or plant oil that may be effective in the method may range from about 5 independently to about 25,000 ppm, based on the total amount of the fluid. In another non-restrictive version, the amount of fish or plant oil may range from a lower end of about 50 independently to an upper end of about 12,000 ppm.

Any suitable mixing apparatus may be used for this procedure. In the case of batch mixing, the acid, the VES gelling agent, the internal breaker and the aqueous fluid are blended for a period of time. The vegetable, and/or animal oil may be added during batch mixing or on the fly during the drilling. The preferred method is batch mixing all additives together prior to being pumped down-hole. The VES typically will be added to the aqueous fluid after the dicarboxylic acid addition, but may be added on the fly during the treatment. Some initial gelling of the VES prior to the acid encountering carbonate in the formation may be acceptable, although in most cases this should not occur due to the initial pH of the fluid being too low, typically less than 4.0 pH.

The VES that is useful herein can be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference in their entirety.

Viscoelastic surfactants improve the drilling fluid performance through the use of a polymer-free system. These systems, compared to polymeric based fluids, can offer improved viscosity breaking, higher sand transport capability (where appropriate), are in many cases more easily recovered after drilling than polymers, and are relatively non-damaging to the reservoir with appropriate contact with sufficient quantity of reservoir hydrocarbons, such as crude oil and condensate. The systems are also more easily mixed "on the fly" in field operations and do not require numerous co-additives in the fluid system, as do some prior systems.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's AROMOX® APA-T formulation, which should be understood as a dipropylamine oxide since both R' groups are propyl.

Materials sold under U.S. Pat. No. 5,964,295 include CLEARFRAC™, which may also comprise greater than 10% of a glycol. One preferred VES is an amine oxide. As noted, a particularly preferred amine oxide is APA-T, sold by Baker Hughes Inc. as SURFRAQ™ VES. SURFRAQ is a VES liquid product that is 50% APA-T and greater than 40% propylene glycol. These viscoelastic surfactants are capable of gelling aqueous solutions to form a gelled base fluid. The additives are used to prepare a VES system sold by Baker Hughes Inc. as DIAMONDFRAQ™. DIAMONDFRAQ™ with its assured breaking technology overcomes reliance on external reservoir conditions in order to break, as compared with products such as CLEARFRAC™.

The methods and compositions herein also cover commonly known materials as AROMOX® APA-T manufactured by Akzo Nobel and other known viscoelastic surfactant gelling agents common to stimulation treatment of subterranean formations.

The amount of VES included in the fluid depends on at least two factors after fluid pH increased. One involves generating enough viscosity to control the rate of fluid leak off into the pores of the reservoir, and the second involves creating a viscosity high enough to carry drilling debris to the surface, in the non-limiting case of a drilling fluid. Thus, depending on the application, the VES is added to the aqueous fluid in concentrations ranging from about 0.5 independently to 25% by volume, alternatively up to about 12 vol % of the total aqueous fluid (from about 5 to 120 gptg). In another non-limiting embodiment, the range for the present formulations is from about 1.0 independently to about 6.0% by volume VES product. In an alternate, non-restrictive form, the amount of VES ranges from a lower limit of about 2 independently to an upper limit of about 10 volume %.

A value of the compositions and methods herein is that a fluid may be designed to have enhanced breaking characteristics. That is, fluid breaking is no longer solely dependent on external reservoir conditions for viscosity break and is controllable: the rate of viscosity reduction, if complete break is achieved/occurs throughout the reservoir interval. Importantly, better clean-up of the VES fluid from the formation and wellbore can be achieved thereby. Better clean-up of the VES directly influences the success of the drilling operation, which is an enhancement of the well's hydrocarbon productivity. VES fluid clean-up limitations and failures of the past can now be overcome or improved by the use of fluid compositions disclosed herein.

It has been further discovered that the addition of certain high viscosity mineral oils in relatively small quantities to an aqueous fluid gelled with a VES improved the fluid loss of these brines, but not in proportions high enough to interfere with the breaking of the VES-gelled fluid. The types and proportions of mineral oils described herein do not noticeably change the initial viscosity of VES-gelled fluids for at least 90 minutes, which is surprising given that reservoir hydrocarbons are known to break VES-gelled fluids.

This discovery allows the VES system to have improved fluid loss to help minimize formation damage during the drilling operation. That is, the introduction of these additives to the VES-gelled aqueous system will limit and reduce the amount of VES fluid which leaks-off into the pores of a reservoir during a drilling procedure, thus minimizing the formation damage that may occur by the VES fluid within the reservoir pores. Also, limiting the amount of VES fluid that leaks-off into the reservoir during a treatment will allow more fluid to remain within the annulus and thus less total fluid volume will be required for the drilling procedure.

In one non-limiting embodiment the mineral oil is added to the fluid before the VES gelling agent. In another non-limiting embodiment herein the mineral oil is added after the aqueous fluid is substantially gelled. By "substantially gelled" is meant that at least 90% of the viscosity increase has been achieved before the mineral oil is added. Of course, it is acceptable to add the mineral oil after the gel has completely formed.

Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydrotreating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry. Other names for mineral oil include, but are not necessarily limited to, paraffin oil, paraffinic oil, lubricating oil, white mineral oil, and white oil.

In one non-limiting embodiment the mineral oil has a high content of isoparaffins, and is at least 99 wt % paraffinic. Because of the relatively low content of aromatic compounds, mineral oil has a better environmental profile than other oils. In general, the more refined and less aromatic the mineral oil, the better. In another non-restrictive version, the mineral oil may have a distillation temperature above about 300° C. In another non-restrictive version, the mineral oil has a dynamic viscosity of greater than about 20 cps at ambient temperature, and is thus considered to be relatively high viscosity. Ambient temperature is defined herein as about 20° C. (68° F.). In an alternate, non-limiting embodiment, the kinematic viscosity of the mineral oil at 40° C. should be at least about 40 cSt. Specific examples of suitable mineral oils include, but are not necessarily limited to, PURE PERFORMANCE® 225N and 600N Base Oils available from Conoco-Phillips, high viscosity ULTRA-S mineral oils from S-Oil Corporation, such as Ultra-S 8, and high viscosity mineral oils from Sonneborn Refined Products, such as GLORIA®, KAYDOL®, BRITOL® 35 USP, HYDROBRITE® 200, 380, 550, 1000, and the like. The dynamic viscosity of PURE PERFORMANCE® 225N oil at 40° C. is typically 42.7 cps, and dynamic the viscosity of 600N oil is typically 114.5 cps. The use of mineral oils herein is safe, simple and economical.

The amount of mineral oil needed to improve the leakoff properties of a particular VES-gelled aqueous fluid is dependent upon a number of interrelated factors and is difficult to predict in advance. Typically, empirical laboratory work is helpful to determine a suitable proportion. It should be an amount effective to reduce fluid loss as compared to an otherwise identical fluid absent the mineral acid. The dynamic viscosity and/or kinematic viscosity, molecular weight distribution, and amount of impurities (such as aromatics, olefins, and the like) appear to influence the effect a particular mineral oil will have on a VES-gelled fluid at a given temperature. The effective amount of mineral oil may range from about 0.2 to about 10% bv (by volume) based on the total fluid, in another non-limiting embodiment from a lower limit of about 0.5% bv. Independently the upper limit of the range may be about 3% bv of the total fluid. Further details about the use of mineral oils to reduce fluid leakoff may be found in U.S. Patent Application Publication 2008/0103066 A1 incorporated by reference in its entirety herein.

The viscoelastic surfactant gelled fluids herein can optionally contain at least one viscosity enhancer. The viscosity enhancers herein also aid with fluid loss control. Suitable viscosity enhancers include, but are not necessarily limited to, pyroelectric particles, piezoelectric particles, and mixtures thereof. Details about the use of pyroelectric and piezoelectric particles may be found in U.S. Pat. No. 7,544,643, incorporated by reference herein in its entirety. In one non-limiting theory or explanation, when the fluid containing the viscosity enhancers is heated and/or placed under pressure, the particles develop surface charges that associate, link, connect, or relate the VES micelles to one another thereby increasing the viscosity of the fluid. This is somewhat analogous to the way crosslinkers connect various polymer chains and is sometimes called "pseudo-crosslinking", but the way the viscosity enhancers associate the elongated or "worm-like" VES micelles is believed to be completely different than the crosslinking that occurs in polymers.

Suitable viscosity enhancers include, but are not necessarily limited to, ZnO, $TiO_2$, berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The viscosity enhancer should not be soluble in the acid used in the fluid. For instance, MgO should not be used. An effective amount of the viscosity enhancer ranges from about 0.1 to about 500 pptg (about 0.012 to about 60 kg/m$^3$) based on the total aqueous viscoelastic treating fluid. The sizes of these microns nanometer-sized viscosity enhancer particles may range from about 1 nanometer to about 2. Alternatively, nanometer-sized particles may be used (on the order of $10^{-9}$ to $10^{-8}$ meters). However, it was discovered that the size of the viscosity enhancer is not a controlling and/or primary factor of methods and compositions herein, that is, to control, improve or enhance VES fluid viscosity.

In order to practice the method herein, an aqueous fluid, as a non-limiting example, is first prepared by blending acid (e.g. dicarboxylic acid blend), VES gelling agent, and internal breaker into an aqueous fluid. The aqueous fluid could be, for example, water, brine, seawater, or mixtures thereof. Any suitable mixing apparatus may be used for this procedure. In one non-limiting embodiment, in the case of batch mixing, the acid, VES gelling agent, internal breaker and the aqueous fluid are blended for a short period of time sufficient to mix the components together, such as for about 15 minutes to about 1 hour. In another non-limiting embodiment all of the acid, VES gelling agent and the internal breaking composition may be added to the aqueous fluid on the fly, during a drilling procedure.

The base fluid may also contain other conventional additives common to the well service industry such as water wetting surfactants, non-emulsifiers, scale inhibitors, and the like, so long as they do not adversely interfere with the stated goals of the method. As noted herein, the base fluid may also contain other non-conventional additives which can contribute to the breaking action of the VES fluid, and which are added for that purpose in one non-restrictive embodiment.

Any or all of the above internal breakers, e.g. vegetable and animal oils may be provided in an extended release form such as encapsulation by polymer or otherwise, pelletization with binder compounds, absorbed or some other method of layering on a microscopic particle or porous substrate, and/or a combination thereof. Specifically, the plant and/or fish oils may be micro- and/or macro-encapsulated to permit slow or timed release thereof. In non-limiting examples, the coating material may slowly dissolve or be removed by any conventional mechanism, or the coating could have very small holes or perforations therein for the oils within to diffuse through slowly. For instance, a mixture of fish gelatin and gum acacia encapsulation coating available from ISP Hallcrest, specifically CAPTIVATES® liquid encapsulation technology, can be used to encapsulate plant, fish, synthetic and other unsaturated breakers. Also, polymer encapsulation coatings such as used in fertilizer technology available from Scotts Company, specifically POLY-S® product coating technology, or polymer encapsulation coating technology from Fritz Industries could possibly be adapted to the methods herein. The internal breakers could also be absorbed onto zeolites, such as Zeolite A, Zeolite 13X, Zeolite DB-2 (available from PQ Corporation, Valley Forge, Pa.) or Zeolites Na-SKS5, Na-SKS6, Na-SKS7, Na-SKS9, Na-SKS10, and Na-SKS13, (available from Hoechst Aktiengesellschaft, now an affiliate of Aventis S.A.), and other porous solid substrates such as MICROSPONGE™ (available from Advanced Polymer Systems, Redwood, Calif.) and cationic exchange materials such as bentonite clay or placed within microscopic particles such as carbon nanotubes or buckminster fullerenes. Further, the internal breakers may be both absorbed into and onto porous or other substrates and then encapsulated or coated, as described above.

In a typical operation, the fluid is pumped at a rate sufficient to effectively drill the reservoir or at a rate to allow time for a small sealing pill volume to enter the reservoir. A typical operation would be conducted by mixing a 20.0 to 60.0 gallon/1000 gal water (60.0 liters/1000 liters) amine oxide VES, such as SURFRAQ, in a 2% (w/v) (166 lb/1000 gal, 19.9 kg/m$^3$) KCl solution at a pH ranging from about 2 to about 6, largely set by the dicarboxylic acid blend proportion, to mention just one of the suitable acid types. The breaking component may be added during the VES addition or after the VES addition using appropriate mixing and metering equipment, or if needed in a separate step after the treating operation is complete, or a combination of these procedures.

In one embodiment, the methods and compositions herein are practiced in the absence of gel-forming polymers and/or gels or aqueous fluids having their viscosities enhanced by polymers. A known difficulty with polymers is that if they form a filter cake that penetrates the formation, the cake is difficult to remove without permanently damaging the near wellbore region of the formation. However, combination use with polymers and polymer breakers may also be of utility. For instance, polymers may also be added to the VES fluid for fluid loss control purposes. Types of polymers that may serve as fluid loss control agents include, but are not necessarily limited to, various starches, modified starches, polyvinyl acetates, polylactic acids, guar and other polysaccharides, hydroxyethylcellulose and other derivatized celluloses, gelatins, and the like.

The present invention will be explained in further detail in the following non-limiting Examples that are only designed to additionally illustrate the invention but not narrow the scope thereof.

GENERAL PROCEDURE FOR EXAMPLES

To a blender were added tap water, HTO™ acid (high temperature organic), internal breaker (fish oil), followed by 4 vol %-viscoelastic surfactant (WG-3L—AROMOX® APA-T available from Akzo Nobel). The blender was used to mix the components on a very slow speed, to prevent foaming, for about 30 minutes to form a 10% bv HTO acid with 2% bv VES and internal breaker fluid. At very slow speed blending, carbonate powder was slowly added to react with the acid. The pH and viscosity of the fluid were measured with a pH meter and Fann-35 viscometer and recorded. After the acid is spent, the sample is loaded in a Grace 5500 rheometer to measure the viscosity vs. shear rate or time at desired temperatures. Samples were only observed for 5 hours or less, as indicated.

Example 1

Shown in FIG. 1 are the results of preparing a drilling fluid as described above that did not initially gel due to the presence of an acid. However, after carbonate was added to react with the acid and the acid was spent, the VES was able to form elongated micelles which interacted with each other to increase the viscosity of the fluid and gel it to give the viscous acid-spent surfactant micellar fluid shown in the photograph that pours only slowly.

Example 2

Figure 2:
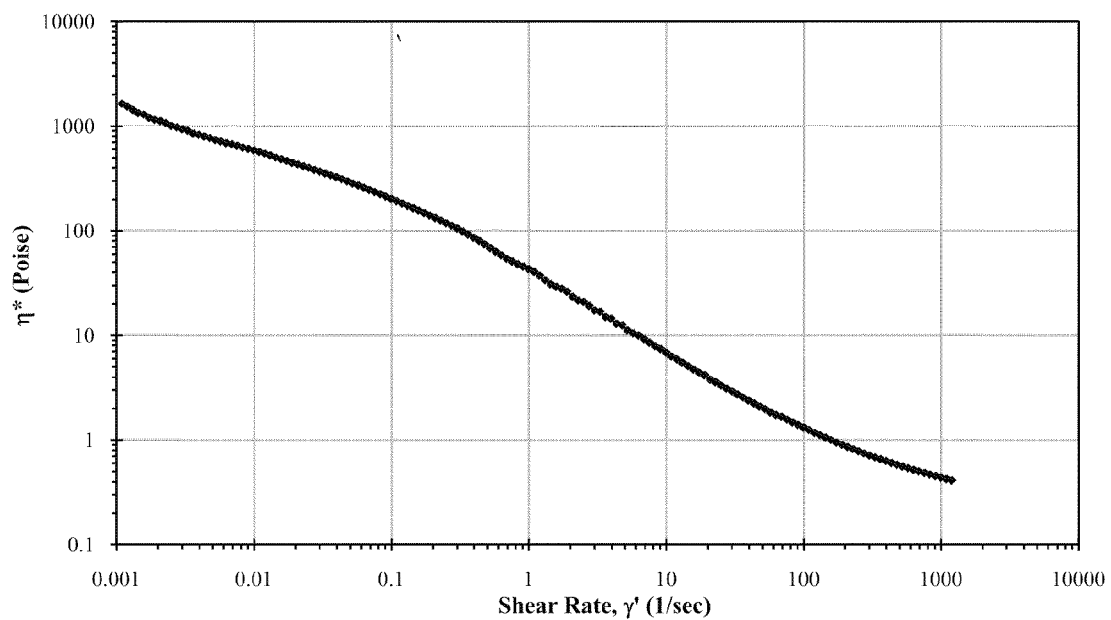
FIG. 2 is a graph of the viscosity profile for a surfactant micellar fluid over a wide shear rate range at ambient temperature.

Shown in FIG. 2 is a graph of the viscosity profile for a surfactant micellar fluid over a wide shear rate range. This aqueous fluid contained 2% bv WG-3L—AROMOX® APA-T VES. It may be seen that the viscosity of the surfactant micellar fluid decreased with increasing shear rate at ambient temperatures, which is expected behavior for a viscoelastic fluid. At low shear rates, the fluid's viscosity can reach to 200,000 centipoises, which can significantly reduce fluid loss through the nature fractures during the drilling.

Example 3

Figure 3:
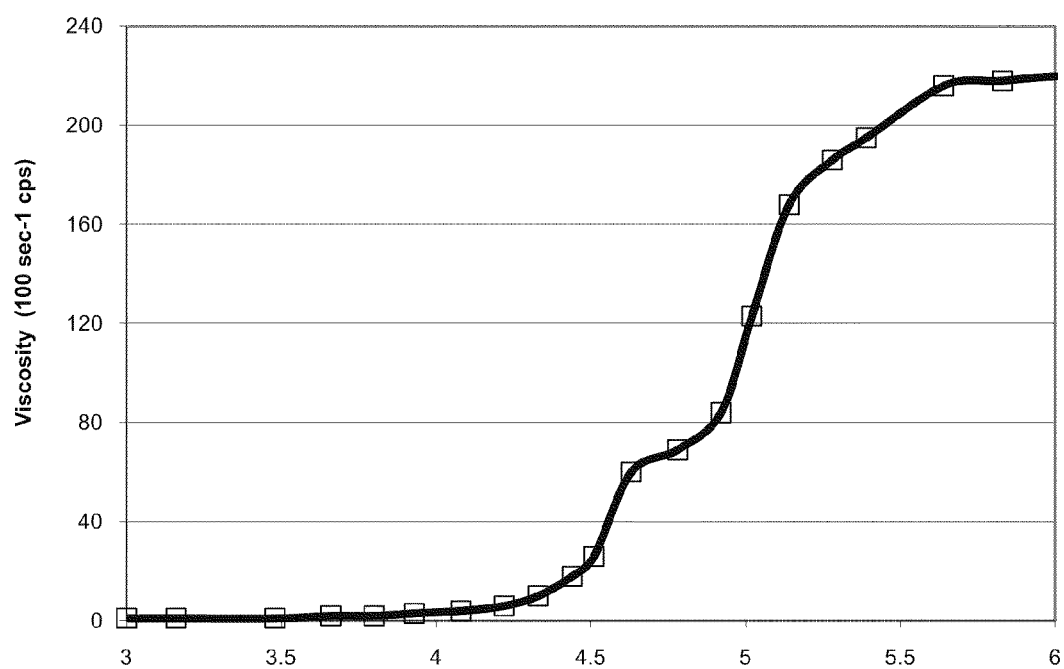
FIG. 3 is a graph showing the viscosity profile of a surfactant-based, self-viscosifying acid-containing fluid as a function of pH illustrating that the viscosity increased as the acid was spent and the pH increased.

A graph showing that the viscosity profile of a surfactant-based, self-viscosifying acid-containing fluid as a function of pH is shown in FIG. 3 illustrating that the viscosity increased as the organic acid was spent by reaction with $CaCO_3$ and the pH increased. This aqueous fluid also contained 2% bv WG-3L—AROMOX® APA-T VES as well as 10% HTO organic acid and a 1% bv fish oil internal breaker.

A method is provided for using aqueous acid-containing drilling fluids gelled with viscoelastic surfactants (VESs) having internal viscosity breakers. Compositions and methods are also furnished herein for breaking VES-surfactant drilling fluids controllably, completely and relatively quickly. As may be seen, the method of gel breaking described herein is simple, effective, safe, and highly cost-effective.

The drilling fluids herein may be used on a one-trip basis or on a continuous basis.

In the foregoing specification, the invention has been described with reference to specific embodiments thereof, and has been demonstrated as effective in providing methods and compositions for using VES-gelled aqueous fluids to drilling subterranean reservoirs where the fluids have an internal breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of viscoelastic surfactants, acids, internal breakers, optional mineral oil, and optional viscosity enhancers and other components falling within the claimed parameters, but not specifically identified or tried in a particular method or drilling fluid, are anticipated to be within the scope of this invention.

The words "comprising" and "comprises" as used throughout the claims is interpreted "including but not limited to".

The present invention may suitably comprise, consist or consist essentially of the elements disclosed and may be practiced in the absence of an element not disclosed. For instance, the fluid (e.g. a drilling fluid or sealing pill fluid) may consist of or consist essentially of water, at least one viscoelastic surfactant (VES) and at least one acid selected from the group consisting of organic acids, mineral acids and combinations thereof, where the VES is present in an amount effective to increase the viscosity of the drilling fluid but for the presence of the at least one acid and where the drilling fluid has a pH between about 2 to about 5.

What is claimed is:

1. A method of drilling into a subterranean formation comprising:
   introducing into a wellbore passing at least partially through the subterranean formation a fluid comprising water, at least one viscoelastic surfactant (VES) and at least one acid selected from the group consisting of organic acids, mineral acids and combinations thereof, where the VES is present in an amount effective to increase the viscosity of the fluid but for the presence of the at least one acid and where the fluid has a pH between about 2 to about 5; and
   at least partially consuming the at least one acid from the fluid by reaction of the at least one acid with a mineral in the subterranean formation, thereby increasing the pH of the fluid to an extent sufficient to increase the viscosity of the fluid by the action of the VES in at least a portion of the fluid to inhibit fluid loss into the formation; and where the mineral is selected from the group consisting of a carbonate, an evaporite, a salt dome, shale, and combinations thereof and further comprises at least one naturally-occurring fracture.

2. The method of claim 1 where the fluid further comprises at least one internal breaker.

3. The method of claim 1 where increasing the viscosity of the fluid is accomplished by elongated micelles; and where the fluid further comprises viscosity enhancers in a concentration effective to associate the elongated micelles together; and the viscosity enhancers are not soluble in the acid.

4. The method of claim 1 where the at least one acid is selected from the group consisting of succinic acid, glutaric acid, adipic acid, acetic acid, malic acid, lactic acid, polylactic acid, glycolic acid, polyglycolic acid, methanesulfonic acid, formic acid, citric acid, tartaric acid, hydrochloric acid of a concentration of equal or less than 5% based on the fluid, and combinations thereof.

5. The method of claim 4 where the concentration of at least one acid in the fluid ranges from about 0.5 to about 30 wt %.

6. The method of claim 1 where the subterranean formation comprises at least 10 wt % calcium carbonate as the mineral therein.

7. The method of claim 1 where the fluid further comprises a mineral oil in an amount effective to reduce fluid loss into the subterranean formation as compared to an otherwise identical fluid absent the mineral oil.

8. The method of claim 1 where the fluid further comprises a water soluble salt selected from the group consisting of NaCl, KCl, $NH_4Cl$, $CaCl_2$, $MgCl_2$, NaBr, $CaBr_2$, sodium formate, potassium formate, cesium formate, sodium salicylate, and combinations thereof.

9. A method of drilling into a subterranean formation comprising:
   introducing into a wellbore passing at least partially through the subterranean formation a fluid comprising water, at least one viscoelastic surfactant (VES) and from about 0.5 to about 30 wt %, based on the total fluid, of at least one acid selected from the group consisting of organic acids, mineral acids and combinations thereof, where the VES is present in an amount effective to increase the viscosity of the fluid but for the presence of the at least one acid, and the at least one acid is selected from the group consisting of succinic acid, glutaric acid, adipic acid, acetic acid, malic acid, lactic acid, polylactic acid, glycolic acid, polyglycolic acid, methanesulfonic acid, formic acid, citric acid, tartaric acid, hydrochloric acid and combinations thereof, where the fluid has a pH between about 2 to about 5; and
   at least partially consuming the at least one acid from the fluid by reaction of the at least one acid with a mineral in the subterranean formation, thereby increasing the pH of the fluid to an extent sufficient to increase the viscosity of the fluid by the action of the VES in at least a portion of the fluid to inhibit fluid loss into the formation; and where the mineral is selected from the group consisting of a carbonate, an evaporite, a salt dome, shale, and combinations thereof.

10. The method of claim 9 where the fluid further comprises at least one internal breaker.

11. The method of claim 9 where increasing the viscosity of the fluid is accomplished by elongated micelles; and where the fluid further comprises viscosity enhancers in a concentration effective to associate the elongated micelles together; and the viscosity enhancers are not soluble in the acid.

12. The method of claim 9 where the subterranean formation comprises at least 10 wt % calcium carbonate as the mineral therein.

13. The method of claim 9 where the fluid further comprises a mineral oil in an amount effective to reduce fluid loss into the subterranean formation as compared to an otherwise identical fluid absent the mineral oil.

14. A method of drilling into a subterranean formation comprising:
   introducing into a wellbore passing at least partially through the subterranean formation a fluid comprising water, at least one viscoelastic surfactant (VES), at least one internal breaker and at least one acid selected from the group consisting of organic acids, mineral acids and combinations thereof, where the VES is present in an amount effective to increase the viscosity of the fluid but for the presence of the at least one acid and where the fluid has a pH between about 2 to about 5;
   at least partially consuming the at least one acid from the fluid by reaction of the at least one acid with a mineral in the subterranean formation, thereby increasing the pH of the fluid to an extent sufficient to increase the viscosity of the fluid by the action of the VES in at least a portion of the fluid to inhibit fluid loss into the formation; and
   subsequently activating the internal breaker thereby reducing the viscosity of the fluid adjacent the wellbore; and where the mineral is selected from the group consisting of a carbonate, an evaporite, a salt dome, shale, and combinations thereof.

15. The method of claim 14 where increasing the viscosity the fluid is accomplished by elongated micelles; the fluid further comprises viscosity enhancers in a concentration effective to associate the elongated micelles together; and where the viscosity enhancers are not soluble in the acid.

16. The method of claim 14 where the at least one acid is selected from the group consisting of succinic acid, glutaric acid, adipic acid, acetic acid, malic acid, lactic acid, polylactic acid, glycolic acid, polyglycolic acid, methanesulfonic acid, formic acid, citric acid, tartaric acid, hydrochloric acid of a concentration of equal or less than 5% based on the fluid, and combinations thereof.

17. The method of claim 16 where the concentration of at least one acid in the fluid ranges from 0.5 to about 30 wt %.

18. The method of claim 14 where the subterranean formation comprises at least 10 wt % calcium carbonate as the mineral therein.

19. The method of claim 14 where the fluid further comprises a mineral oil in an amount effective to reduce fluid loss into the subterranean formation as compared to an otherwise identical fluid absent the mineral oil.

20. The method of claim 14 where activating the internal breaker comprises heating the fluid to a temperature effective to activate the breaker.

* * * * *